United States Patent

[11] 3,594,073

[72] Inventor John N. Liautaud
 Glenview, Ill.
[21] Appl. No. 840,426
[22] Filed July 9, 1969
[45] Patented July 20, 1971
[73] Assignee Fendall Company
 Chicago, Ill.

[54] SPECTACLE HINGE
 6 Claims, 5 Drawing Figs.
[52] U.S. Cl. .................................................. 351/141,
 16/128 A, 16/169, 351/116, 351/153
[51] Int. Cl. .................................................. G02c 5/22
[50] Field of Search .......................................... 391/111,
 140, 116, 141, 121, 153; 16/128, 169

[56] References Cited
UNITED STATES PATENTS
2,933,016 4/1960 Kunde et al .................... 351/121 X
FOREIGN PATENTS
124,686 4/1919 Great Britain ................. 16/169

Primary Examiner—David Schonberg
Assistant Examiner—John W. Leonard
Attorney—Hill, Sherman, Meroni, Gross & Simpson ABSTRACT: A spectacle hinge incorporating interleaved hinge members and a hinge pin passing pivotally therebetween wherein the hinge pin is provided with projecting means providing an interlocking relationship with one of the hinge members in normal positions of spectacle operation or storage in a manner preventing inadvertent hinge disassembly.

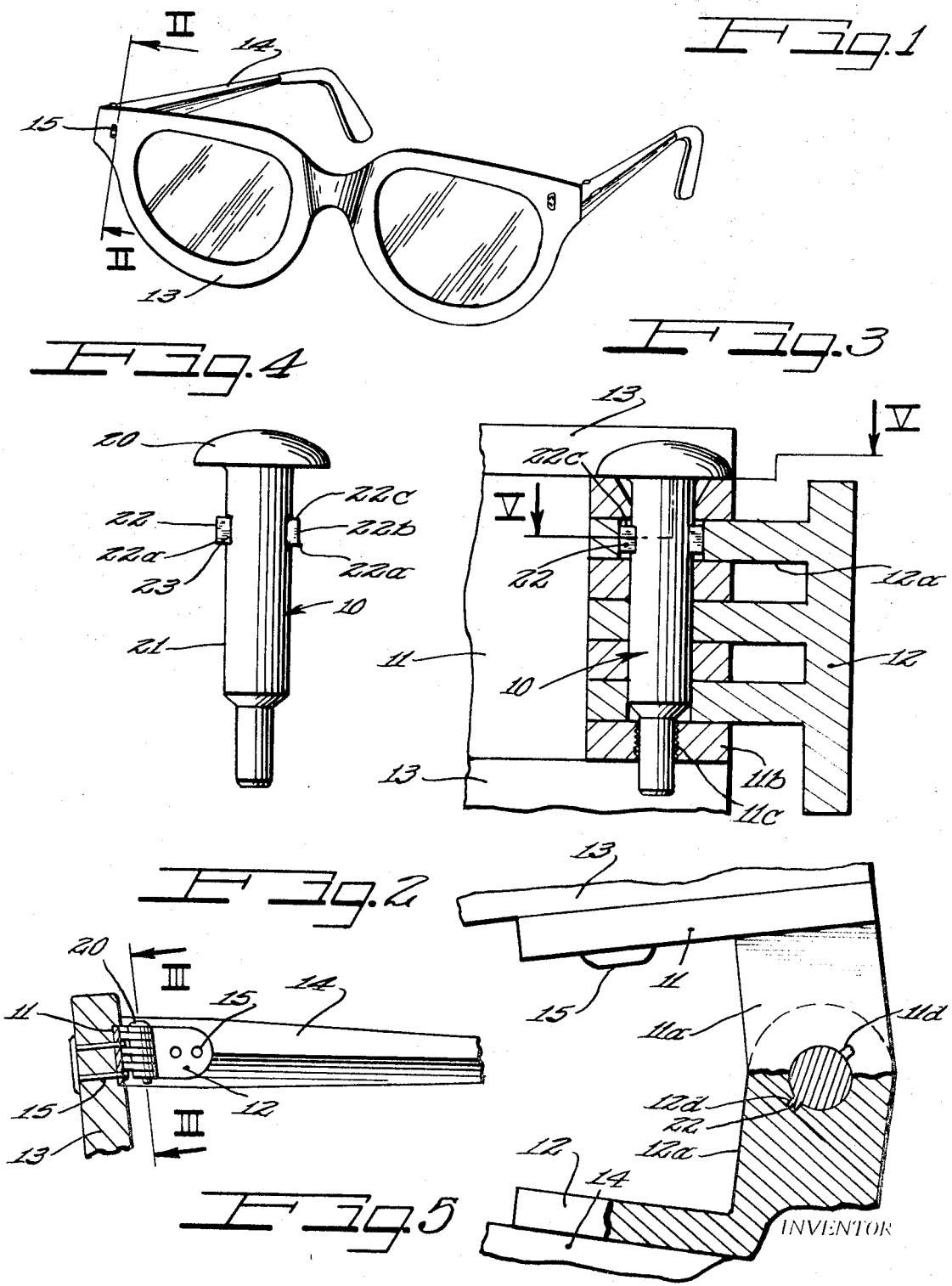

SPECTACLE HINGE

BACKGROUND OF THE INVENTION

Spectacle frames have long been manufactured with a main frame portion having two lenses and two temples pivotally attached thereto. In prior art devices, the temples are pivotally secured to the main frame by way of hinge members. The hinge members comprise interleaved hinge plates respectively secured to the main frame and a temple, and a generally vertically disposed hinge pin passing through the interleaved portions by way of aligned apertures. Typically, such hinge assemblies incorporate a pin having a threaded portion arranged for cooperation with a threaded portion in the hinge. Unfortunately, in heavy-duty use, continued oscillation of the temple relative to the frame often causes loosening of the screw and loss of the pin. Many techniques have been proposed for overcoming such inadvertent disassembly. The structure of the present invention provides a hinge with substantially complete retentivity. Further, in at least one embodiment the hinge pin employed in accordance with the present invention is compatible with prior art threaded hinge barrels and may be substituted in the field for such prior art threaded hinge pins.

SUMMARY OF THE INVENTION

In accordance with the principles of the present invention, a cylindrical hinge pin is employed. The hinge pin has a basic diameter substantially the same as the aperture diameter of both parts of the spectacle hinge. In most spectacle hinges constructed in recent times, a plurality of hinge leaves are found on each hinge member and the two are interleaved so that the apertures on the individual leaves of both hinge members are in alignment. Following this alignment, a pin is passed into position in the aligned apertures. In accordance with the present invention, the hinge pin has radial projections at one or more points in its periphery constructed to mate with radial recesses in hinge leaves of both hinge members. The pin is preferably constructed of a relatively hard and corrosion-resistant material of a hardness equal to or greater than the hardness of the hinge plate material. After the hinge members have been interleaved and the apertures and the recesses therein aligned in an abnormal temple position, the pin is pushed into the aperture with the protrusions ultimately seating in the mating recess or recesses of one of the hinge members. In the final position, each protrusion on the pin is seated in a single hinge leaf and when the temple is pivoted away from the recess-aligned or abnormal position, the pin cannot fall axially out of the hinge. I have found that this interlocking relationship provides a combination in which the pin remains fixed against axial removal in use. The pin is not rotational in the hinge and has no apparent means of being disassembled. If desired, however, the pin may be provided with an extension which projects through the end of the hinge barrel for cooperation with a plier for simplification of removal.

It is, accordingly, an object of the present invention to provide an improved spectacle hinge and hinge pin providing a substantially improved construction preventing inadvertent disassembly.

BRIEF DESCRIPTION OF THE DRAWINGS

As shown on the drawings,

FIG. 1 is an isometric view of a spectacle assembly;

FIG. 2 is a cross-sectional view, taken along the line II–II of FIG. 1;

FIG. 3 is an enlarged cross-sectional view taken along the line III–III of FIG. II;

FIG. 4 is a detailed elevational view of the hinge pin of the present invention; and FIG. 5 is a cross-sectional view of the pin shown in FIG. 4 taken along the line V–V showing recess alignment.

DETAILED DESCRIPTION

As can be seen from a consideration of FIGS. 1 through 5, a preferred embodiment of the present invention comprises a hinge pin 10 pivotally securing hinge members 11 and 12 attached respectively to the main spectacle frame 13 and temples 14. The hinge plates 11 and 12 may be conventional, if desired, and may be secured in any conventional manner to the frame and temple, respectively. In the embodiment illustrated, rivets 15 are satisfactorily employed for this purpose. When conventional hinge members 11 and 12 are employed, the lowermost hinge leaf or barrel 11b is provided with a threaded portion 11c having a standard thread. Such a thread cooperates with a standard threaded screw pin but forms no part of the combination of the present invention in which the pin is unthreaded.

The hinge pin generally illustrated at 10 comprises an enlarged head portion 20 and a shank portion 21 which is substantially cylindrical and a round cross section. Protrusions or ears 22 are provided on the periphery of the pin, as by staking or cold die-forming which flows the pin material from the main shank 21 into the projections 22 leaving slight depressions 23 from which the material has flowed. In effect, the ears are thus formed by pinching the surface of the shank 21 in the preferred embodiment. However, it will be understood that the protrusions may be provided by welding or other means, if desired.

In accordance with the present invention, the uppermost hinge leaf or barrel 11a is slotted as at 11d shown in FIGS. 3 and 5. Similarly, the leaf 12a is provided with a slot 12d. These slots 11d and 12d accommodate the projections 22 and permit, when the slots 11d and 12d are aligned, the passage of the pin 20 with the projections 22 thereon into the assembled position shown in FIG. 3. If the slots 11d and 12d are constructed somewhat larger than the projections 22, the pin 20 may be removed, when the slots 11d and 12d are aligned, merely by applying an upward displacement pressure or by turning the hinge upside down. However, the likelihood of such a disassembly in accordance with the present invention is overcome by providing the slots 11d and 12d in circumferential positions that are aligned only when the frame and temple members are in an unusual or abnormal relative position. Spectacles are ordinarily either folded for carrying in a pocket or a spectacle case, or open for position on the wearer. These two conditions may be considered "normal" conditions. Positioning of the temple within the approximately 90° of arc between the normal-open and normal-folded position would place the temple in an abnormal condition. Similarly, if the temple were forced toward the frame beyond the "normal" folded condition by flexing the temple, a further abnormal position would be provided. In accordance with the present invention, alignment of the slots 11d and 12d is provided when the hinge portions are in an abnormal condition. Accordingly, in the normal conditions of position in which the spectacles are used or in a state of nonuse, the slots are out of alignment and it is impossible for the pin to move axially out of assembled relation. It will be observed that when the pin is in its assembled condition, the slots 11d are hidden below the head 21a of the pin and, accordingly, unless the user of the spectacle knows the precise position of alignment, he will be unable to remove the pin.

Since flexing of the temple toward the frame beyond the normal folded condition is unlikely, and since the normal spring of the temples will make such a motion almost impossible as a result of inadvertence, it is preferred that alignment of the slots 11d and 12d be provided for in such a position as shown in FIG. 5. There, the temple 14 is forced several degrees closer to the frame 13 than the normal folded condition. With the parts in this position the pin may be dropped into the aligned apertures of the hinge parts or, alternatively, simply removed.

As above described, the protrusions 22 are slightly smaller than the slots 11d and 12d. Since the pin 10 is preferably of a harder material than the hinge barrels, the protrusions 22 may be constructed in the form of a self-broaching projection. As thus constructed, the downward or leading edge 22a as shown in FIG. 4 is preferably square with a slight relief as shown at 22b in a somewhat exaggerated form. With the parts thus constructed the pin may be forced downwardly through leaf 11a into leaf 12d therebelow cutting the slot as it goes. In accordance with the present invention, the hinge parts would be positioned in an abnormal condition at the time of this forced insertion and upon rotation of the hinge parts, withdrawal of the pin would be prevented by the upper edge 22c of the projection 22 just as in the case earlier described.

It will be apparent to those skilled in the art that a single projection 22 may be employed rather than a pair as illustrated. Further, it will similarly be clear that more than one of the leaves 11a and 12a may be slotted. In this latter event, it is preferred that where two pairs of leaves are slotted, two axially spaced projections be provided, with the spacing at least as great or slightly greater than the thickness of the intermediate leaf.

It will be apparent from the above, that I have provided a novel, extremely simple, and inexpensive hinge, particularly adapted to heavy-duty safety glasses or the like. Further variations and modifications may be made in accordance with the present invention without departing from the spirit thereof and it is intended, accordingly, that the invention be limited solely by that of the hereinafter appended claims.

I claim as my invention:

1. In combination in spectacles comprising a frame having a pair of temples pivotally movable relative thereto and normally in either folded condition for storage or extended position for wearing, a hinge member on each temple for cooperation with a respective hinge member on the frame, cooperating hinge members having in combination at least three interleaved portions apertured to accept a pivot pin, a generally cylindrical pivot pin for cooperation with said interleaved portions, said pin having at least one radial projection thereon and both said cooperating hinge members having slots in the top two interleaved portions opening into said apertures to pass said projection, said slots being axially aligned only when said hinge members are out of said normal conditions.

2. The structure of claim 1 wherein said pin has a plurality of projections.

3. The structure of claim 2 wherein said projections are diametrically opposed.

4. The structure of claim 1 wherein said slots are aligned when said temples are folded toward said frame beyond the normal folded condition.

5. The structure of claim 1 wherein said slots are aligned when said temples are in a pivoted condition between normal open and normal folded condition.

6. The structure of claim 1 wherein said projection comprises a material harder than the material of said interleaved portions and has its axially forwardly facing edge operable to form said slots in the interleaved portions upon axial movement of the pin with said projection into said interleaved portions.